United States Patent [19]

Mizumoto

[11] Patent Number: 4,540,087
[45] Date of Patent: Sep. 10, 1985

[54] THREE-DIMENSIONAL WORK TRANSFER APPARATUS

[75] Inventor: Masakatsu Mizumoto, Kanazawa, Japan

[73] Assignee: Kabushiki Kaisha Komatsu Seisakusho, Tokyo, Japan

[21] Appl. No.: 524,080

[22] Filed: Aug. 17, 1983

[30] Foreign Application Priority Data

| Aug. 19, 1982 | [JP] | Japan | 57-142693 |
| Aug. 19, 1982 | [JP] | Japan | 57-124444[U] |
| Aug. 19, 1982 | [JP] | Japan | 57-124445[U] |
| Aug. 19, 1982 | [JP] | Japan | 57-124446[U] |
| Aug. 19, 1982 | [JP] | Japan | 57-124447[U] |

[51] Int. Cl.³ .................................... B65G 25/00
[52] U.S. Cl. ......................... 198/621; 198/774
[58] Field of Search ............................... 198/774, 621

[56] References Cited

U.S. PATENT DOCUMENTS

| 3,456,814 | 7/1969 | Bautz | 198/621 |
| 3,738,503 | 6/1973 | Wallis | 198/621 X |
| 3,757,961 | 9/1973 | Jacobs | 198/621 |
| 4,359,153 | 11/1982 | Gerben et al. | 198/621 |
| 4,436,199 | 3/1984 | Baba et al. | 198/621 X |
| 4,462,521 | 7/1984 | Takagi | 198/621 |

Primary Examiner—Joseph E. Valenza
Assistant Examiner—Michael Stone
Attorney, Agent, or Firm—Armstrong, Nikaido, Marmelstein & Kubovcik

[57] ABSTRACT

Apparatus particularly well suited for successively transferring generally flat workpieces through a series or processing stations in a transfer press. Included are a pair of transfer bars extending horizontally in parallel spaced relation to each other. Disposed adjacent one end of the transfer bar pair, a feed mechanism longitudinally reciprocates the transfer bars. A pair of clamp mechanisms and a pair of lift mechanisms, disposed adjacent the opposite ends of the transfer bar pair, move the transfer bars toward and away from each other, and up and down, respectively. The transfer bars repeats the longitudinal, transverse, and vertical motions in a prescribed sequence for work transfer through the successive press stations. The feed, clamp, and lift mechanisms are all driven by respective DC servomotors so that the longitudinal, transverse, and vertical strokes of the transfer bars ar infinitely variable. The apparatus may additionally comprise overload protection mechanisms for preventing the bending or breaking of the transfer bars when the latter are overloaded during movement toward each other.

8 Claims, 12 Drawing Figures

THREE-DIMENSIONAL WORK TRANSFER APPARATUS

BACKGROUND OF THE INVENTION

This invention concerns apparatus for indexing or conveying work to be operated upon in various ways, and deals more specifically with apparatus having a pair of parallel spaced transfer bars for transferring work through a series of processing stations as, for example, in a three-dimensional transfer press.

As is well known, the three-dimensional transfer press is a streamlined machine incorporating a series of press stations for continuously processing flat work into a variety of panel products such as those used for roofing, flooring, and doors. Extending horizontally throughout the press, the aforesaid pair of transfer bars are reciprocated longitudinally and further moved up and down and toward and away from each other. By the repetition of these motions in a prescribed sequence the transfer bars act to grip, lift, and transport successive workpieces from one press station to the next.

The conventional mechanisms for such longitudinal, transverse, and vertical motions of the transfer bars have all been driven from the transfer press itself via gear trains, linkage systems, etc. Consequently, in order to provide several different transfer bar strokes in each of the longitudinal, transverse, and vertical directions, as many cams or equivalent machine elements have had to be incorporated in each mechanism, making it complex in construction and bulky in size.

With use of the cams or the like, moreover, the transfer bar strokes are not infinitely variable, but only stepwise. Nor are the transfer bar positions at the starts and ends of their longitudinal, transverse, and vertical movements easily readjustable. This is highly inconvenient as the transfer press is intended to handle workpieces of various shapes and sizes for the fabrication of correspondingly varied pressings.

An additional problem of the prior art arises from the fact that the mechanisms fof the longitudinal, transverse, and vertical motions of the transfer bars have all been mechanically and operationally interrelated. This has made it difficult to service the mechanisms individually, and to split up the transfer bars into required numbers of segments for the change of press dies as well as of work gripping fingers on the transfer bars.

SUMMARY OF THE INVENTION

The present invention enhances the utility of three-dimensional work transfer apparatus of the type in question by making it possible to infinitely vary the longitudinal, transverse, and vertical strokes of the transfer bars, as well as the transfer bar positions at the starts or ends of these strokes.

In attaining the above objective, moreover, the invention also succeeds in materially simplifying the construction of the apparatus and in making the mechanisms for the longitudinal, transverse, and vertical motions of the transfer bars mechanically, or at least operationally, independent of each other.

Stated briefly, the invention provides three-dimensional work transfer apparatus comprising a pair of transfer bars extending in parallel spaced relation to each other. A feed mechanism lies adjacent one end of the transfer bar pair for longitudinally reciprocating the same. A pair of clamp mechanisms are disposed adjacent the opposite ends of the transfer bar pair for conjointly moving the transfer bars toward and away from each other. A pair of lift mechanism are also positioned adjacent the opposite ends of the transfer bar pair for conjointly moving the same up and down. The feed, clamp, and lift mechanisms are all driven by separate drive means including separate direct-current (DC) servomotors.

The DC servomotors are easy to control for causing the desired longitudinal, transverse, and vertical motions of the transfer bars in a prescribed sequence. The DC servomotors permit infinite changes in the longitudinal, transverse, and vertical strokes of the transfer bars and, of course, in the positions of the transfer bars at the starts and ends of these strokes. Further the independent DC servomotor drives make it unnecessary to interlock all of the feed, clamp, and lift mechanisms as in the prior art. Consequently the servicing of the individual mechanisms and the splitting of the transfer bars as for die change are far easier than heretofore.

According to an additional feature of the invention the apparatus may comprise overload protection mechanisms associated with the clamp mechanisms. The overload protection mechanisms function to protect the transfer bars against bending or breaking when they are overloaded while being moved toward each other by the clamp mechanisms.

The above and other objectives, features, and advantages of this invention and the manner of realizing them will become more apparent, and the invention itself will best be understood, from a study of the following description and appended claims, with reference had to the attached drawings showing an exemplary embodiment of the invention.

DESCRIPTION OF THE PREFERRED EMBODIMENT

General

Figure 1:
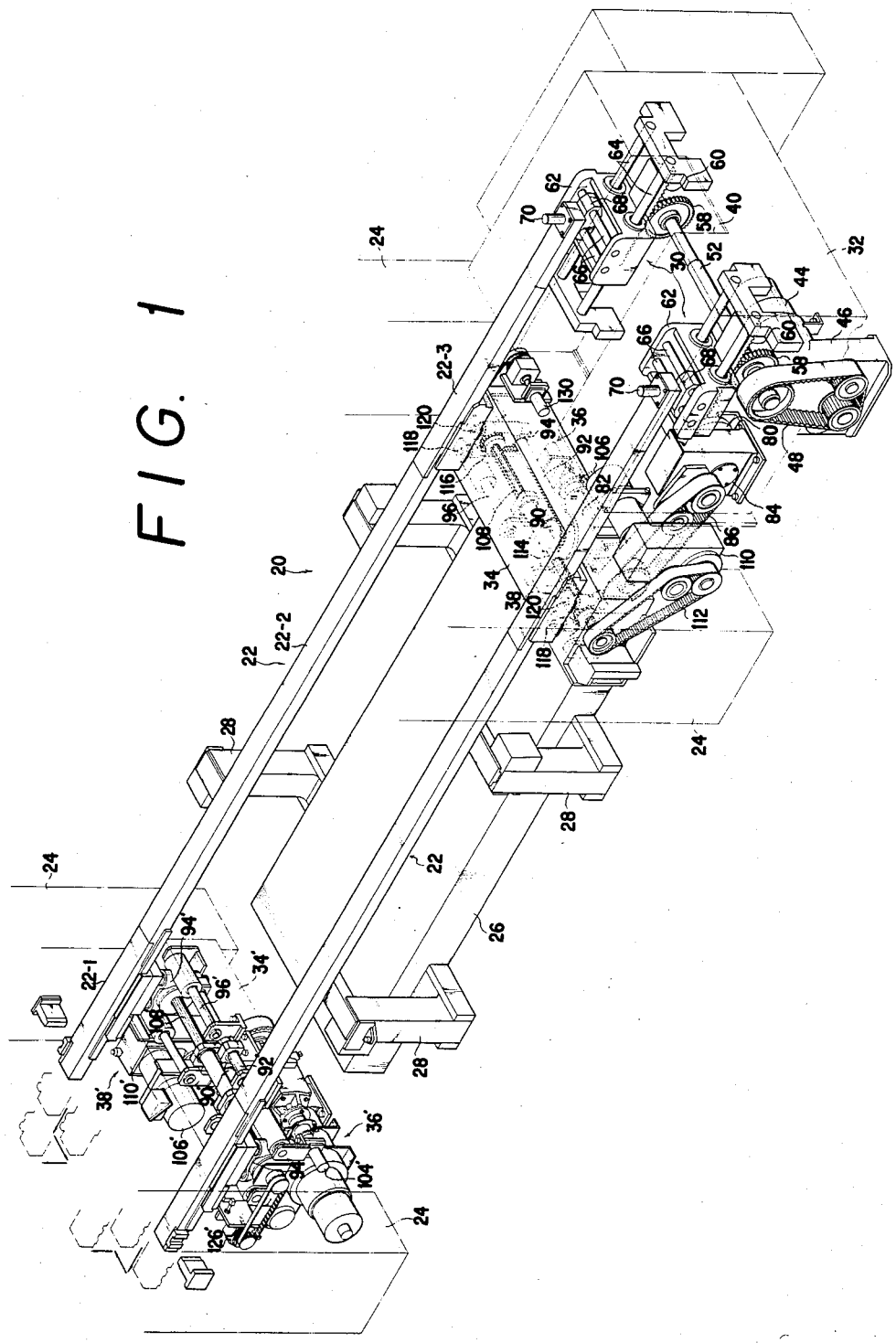
FIG. 1 shows in perspective the three-dimensional work transfer apparatus constructed in accordance with the principles of the invention, the apparatus being shown as adapted for use with a transfer press.

A consideration of FIG. 1 will make clear the general organization of the exemplified three-dimensional work transfer apparatus in accordance with the invention for use with a transfer press. Generally designated 20, the work transfer apparatus has a pair of transfer bars 22 extending horizontally in parallel spaced relation to each other. On either side of the transfer bars 22 there are semipermanently installed a plurality of, two in the illustrated embodiment, uprights or columns 24 holding the crown, not shown, of the transfer press on their tops.

For the change of the press dies, not shown, the transfer bars 22 must be moved sideways out of the press. Being longer than the distance between the uprights 24 on either side, however, the transfer bars cannot possibly be so moved unless they are split up. Each transfer bar is shown to be split into three segments, designated 22-1, 22-2 and 22-3, with the central bar segment 22-2 made shorter than the spacing between the two uprights 24 on each side of the transfer bars. The three segments of each transfer bar are normally rigidly joined together. For die chanage the two terminal segments 22-1 and 22-3 of each transfer bar are longitudinally moved away from the central segment 22-2. Then the central segments 22-2 of the two transfer bars are removed out of the press together with the unshown press dies on a movable bolster 26. The reference numeral 28 designates bar rests on the movable bolster 26. The central transfer bar segments 22-2 are to be deposited on these rests 28 upon being disconnected from the terminal bar segments 22-1 and 22-3.

Such segmented transfer bars have been known, however, and by themselves consitute no feature of the invention.

At an exit end of the transfer bar pair 22, directed to the right in FIG 1, there is provided a feed mechanism 30 for longitudinally reciprocating the transfer bars. A housing 32 encloses the feed mechanism 30. Lying just upstream of the feed mechanism housing 32 is another housing 34 accommodating a clamp mechanism 36 and a lift mechanism 38. Still another housing 34' lies at the entrance end of the transfer bar pair 22. This additional housing envelopes another similar clamp mechanism 36' and another similar lift mechanism 38'. The pair of clamp mechanisms 36 and 36' coact to move the transfer bars 22 toward and away from each other. The pair of lift mechanisms 38 and 38', on the other hand, coact to move the transfer bars up and down.

Although not clearly seen in FIG. 1, overload protection mechanisms are further provided in structural and operational relation with the clamp mechansims 36 and 36'. The overload protection mechanisms function to prevent the bending or breaking of the transfer bars 22 when they are overloaded while being moved toward each other by the clamp mechanisms 36 and 36'.

Given hereafter is a more extensive discussion of the feed mechanism 30, pair of clamp mechanisms 36 and 36', pair of lift mechanisms 38 and 38', and overload protection mechanisms, under the respective headings. The operational description of the complete work transfer apparatus will follow the detailed discussion of the listed mechanisms.

Feed Mechanism

Figure 2:
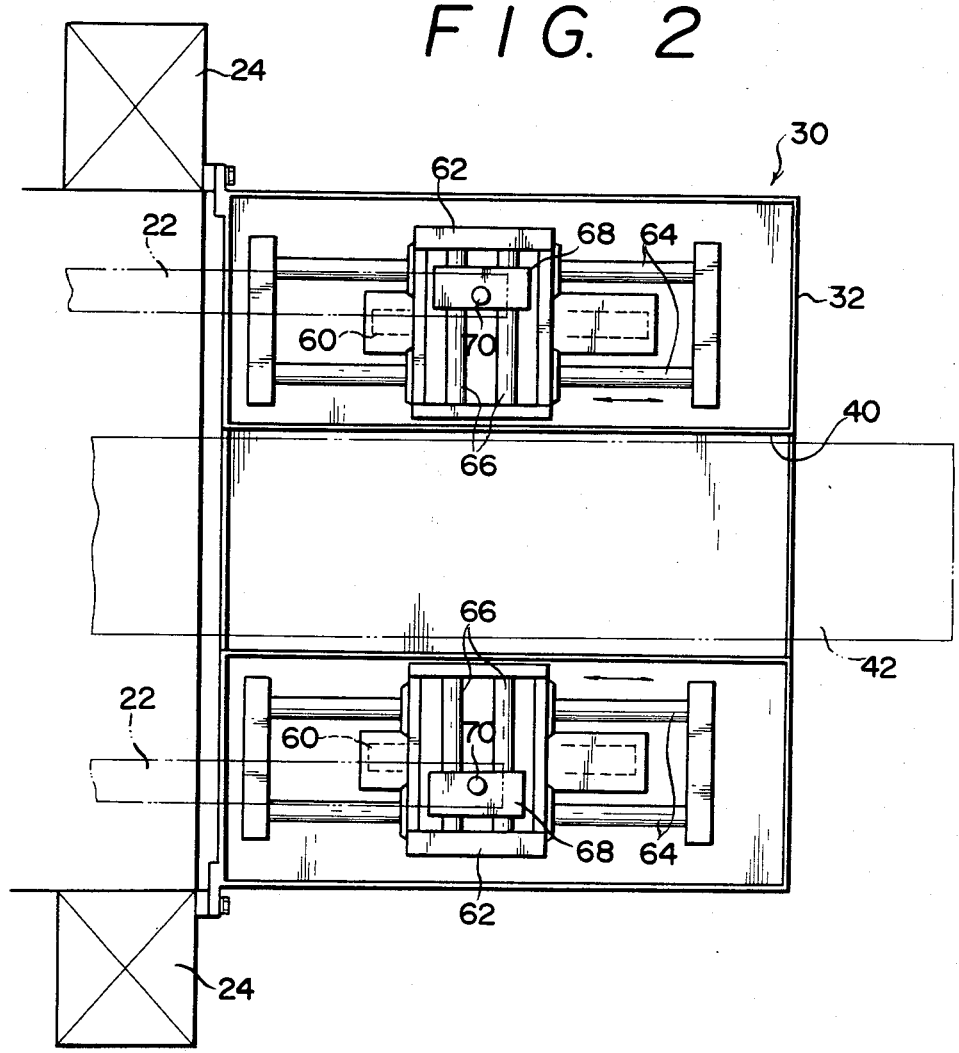
FIG. 2 is an enlarged top plan of the feed mechanism in the apparatus of FIG. 1.
Figure 3:
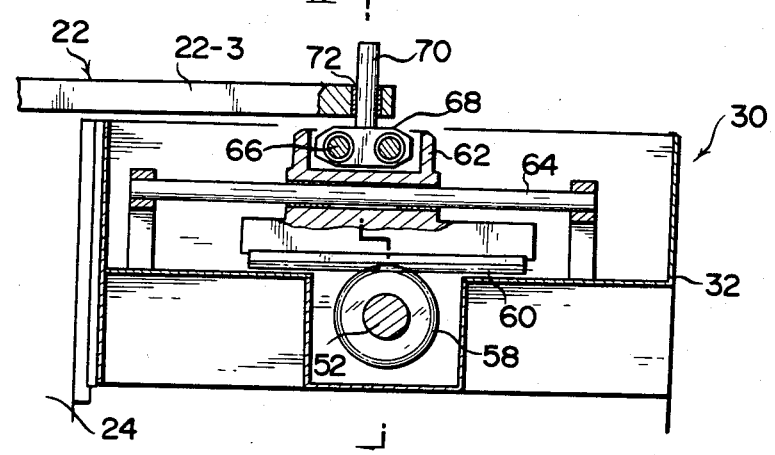
FIG. 3 is a vertical section through the feed mechanism of FIG. 2, the section being taken longitudinally of the apparatus.
Figure 4:
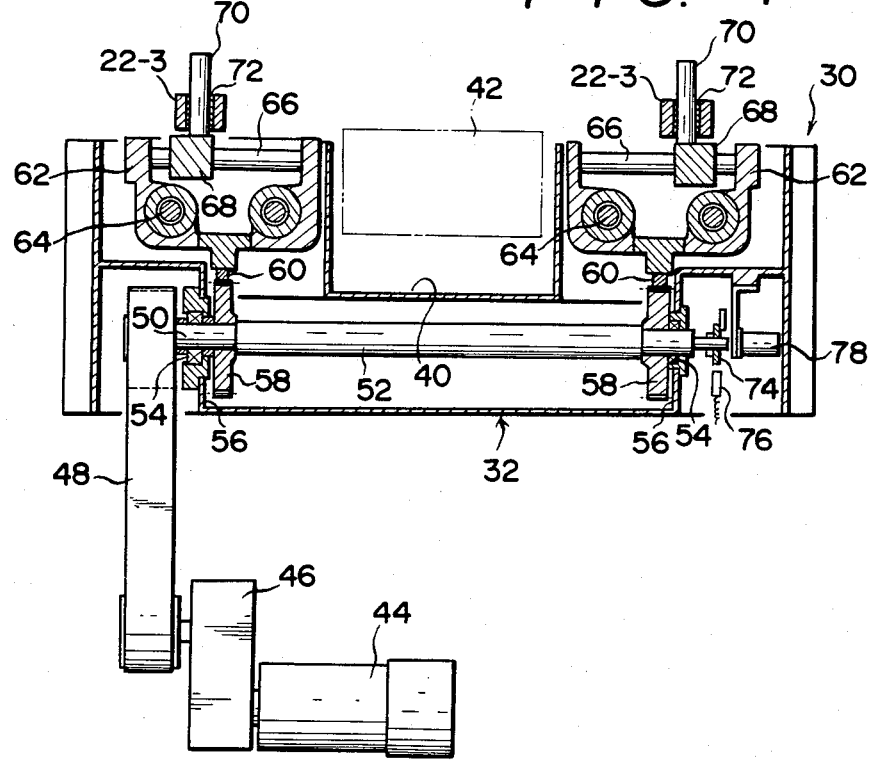
FIG. 4 is also a vertical section through the feed mechanism, taken along the line IV—IV of FIG. 3.

Reference is directed to FIGS. 2, 3 and 4, in addition to FIG. 1, for the details of the feed mechanism 30. It will be noted from these figures that the housing 32 accommodating the feed mechanism 30 is recessed at 40 to make room for a delivery conveyor 42 for discharging the completed pressings, not shown, from the apparatus. This delivery conveyor should not be considered a part of the feed mechanism 30, although the improved construction of the feed mechanism has made possible the provision of the delivery conveyor, as will be explained in more detail presently.

The feed mechanism 30 is powered by a DC servomotor 44, FIGS. 1 and 4, disposed under the feed mechanism housing 32. The DC servomotor 44 driving the feed mechanism 30 will hereinfter be referred to as the feed motor in contradistinction to other DC servomotors that are to appear subsequently. The feed motor 44 is coupled via a speed reducer 46 and timing belt or like drive linkage 48 to an extension 50 of a drive shaft 52 disposed horizontally within the feed mechanism housing 32 in right angular relation to the pair of transfer bars 22.

FIG. 4 best illustrates that the drive shaft 52 has its opposite ends rotatably journaled in a pair of bearings 54 on the opposed walls 56 of the feed mechanism housing 32. Nonrotatably mounted on the drive shaft 52 in the vicinities of its opposite ends are a pair of pinions 58 in mesh with a pair of racks 60. These racks are secured to the undersides of a pair of carriages 62 so as to extend parallel to the transfer bars 22. Each approximately in the shape of an open top box, the carriages 62 lie just under the terminal segments 22-3 of the transfer bars 22 for reciprocating movement along the same as guided by respective pairs of guide rods 64.

Each carriage 62 has fixedly mounted thereon another pair of guide rods 66 arranged at right angles with the transfer bars 22. Slidable along each pair of guide rods 66 is another carriage 68 having an upstanding guide pin 70 rigidly mounted thereon. The first recited pair of carriages 62 and the second pair of carriages 68 will hereinafter be distinguished from each other by being termed the longitudinal carriages and the transverse carriages respectively. The guide pins 70 slidably extend, via sleeve bearings 72, through bores defined in the exit ends of the terminal segments 22-3 of the transfer bars 22.

It is thus seen that the feed mechanism 30 functions to impart longitudinal reciprocation to the transfer bars 22 while allowing them to move further up and down and toward and away from each other. The upstanding guide pins 70 must of course be longer than the predetermined maximum up-and-down stroke of the transfer bars. As will be understood, the pair of longitudinal carriages 62 could be combined into one. The provision of the two separate longitudinal carriages is preferred, however, because they afford a large space therebetween for the installation of the delivery conveyor 42.

FIG. 4 further shows an overrun detector cam 74, a non-contacting switch 76 operatively associated therewith, and a selsyn or like device 78 for the provision of a signal for controlling the operation of the feed mechanism in timed relation to the operations of the other mechansims.

Clamp Mechanisms

As has been stated in conjunction with FIG. 1, the pair of clamp mechanisms 36 and 36' as well as the pair of lift mechanisms 38 and 38' are enclosed in the respective housings 34 and 34' disposed between the two opposed pairs of uprights 24. The clamp mechanisms 36 and 36' are of like construction, so that only the right hand clamp mechanism 36 will be described in detail with reference to FIGS. 5 and 6, it being understood that the same description applies to the other clamp mechanism 36'. The various parts of this other clamp mechanism 36' will be identified merely by priming the reference numerals used to denote the corresponding parts of the representative clamp mechanism 36.

Driving the clamp mechanism 36 is another DC servomotor 80, FIG. 1, positioned outside the clamp and lift mechanism housing 34. The DC servomotor 80 will be called the clamp motor hereafter. The clamp motor 80 is coupled to a bevel gear assembly 82, FIGS. 1 and 6, via a speed reducer 84 and timing belt or like drive linkage 86. Mounted to the underside of the clamp and lift mechanism housing 34, the bevel gear assembly 82 has an output shaft 88 extending upwardly into the housing.

A pinion 90 is fixedly mounted on the top end of the bevel gear assembly output shaft 88 and so is positioned centrally between the pair of transfer bars 22. A pair of racks 92 extending parallel to each other from respective clamp carriages 94 which are coupled to the respective terminal segments 22-3 of the transfer bars 22 in a manner yet to be described. The racks 92 mesh with the pinion 90 on its opposite sides.

Figure 5:
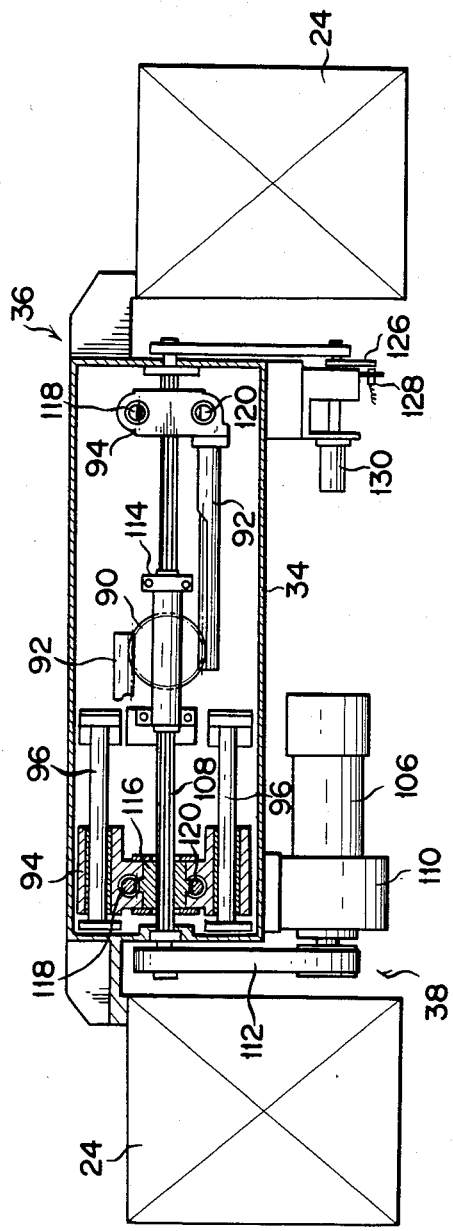
FIG. 5 is an enlarged horizontal section through one of the clamp mechanisms and an associated one of the lift mechanisms in the apparatus of FIG. 1.
Figure 7:
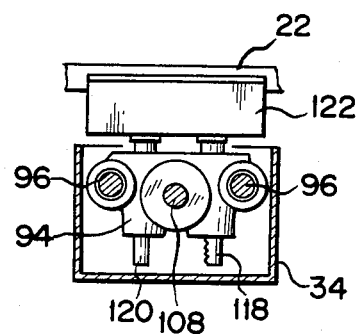
FIG. 7 is a section along the line VII—VII of FIG. 6.

An inspection of FIGS. 1, 5 and 7 will reveal that each clamp carriage 94 is slidably mounted on a pair of guide rods 96 arranged at right angles with transfer bars 22. Disposed opposite to each other, the pair of clamp carriages 94 have the racks 92 extending from their opposed faces toward each other so as to mesh with the pinion 90 on its opposite sides. The clamp carriages are movable with the transfer bars 22 along the pairs of guide rods 96.

Thus the rotation of the pinion 90 in a clockwise direction, as viewed in FIG. 5, results in the movement of the transfer bars 22 toward each other. Pinion rotation in a counterclockwise direction results, of course, in transfer bar movement away from each other.

The positioning of the pinion 90 centrally between the transfer bars 22 for simultaneous engagement with the racks 92 extending from the opposed faces of the clamp carriages 94 constitute one of the features of the clamp mechansim 36. This arrangement avoids the collision of the racks with the uprights 24 during the movement of the transfer bars away from each other, so that the uprights need not be recessed to accommodate the racks.

Figure 6:
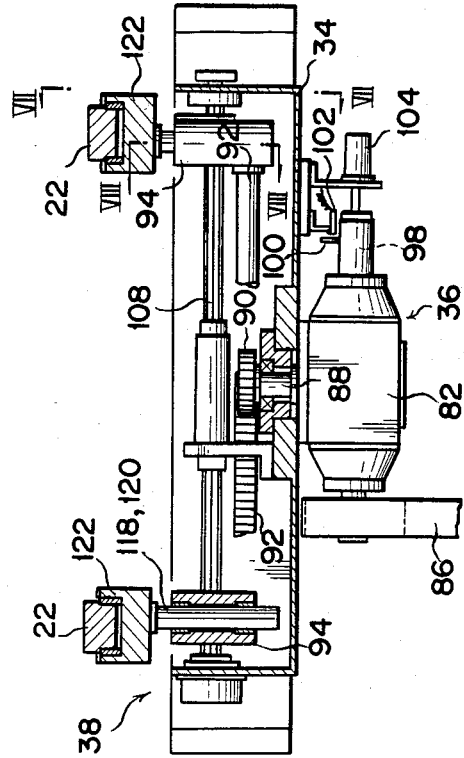
FIG. 6 is a vertical section through the clamp and lift mechanisms of FIG. 5.

With reference to FIG. 6 the bevel gear assembly 23 has another shaft 98 projecting horizontally therefrom. This shaft carries an overrun detector cam 100 associated with a noncontacting switch 102. Also provided is a selsyn or like device 104 for the provision of a signal for controlling the operation of the clamp mechanism in timed relation to the operations of the other mechanisms.

Lift Mechanism

A study of FIGS. 5, 6, 7 and 8 will make clear the construction of the representative lift mechansim 38, the other lift mechanism being of the like construction. This mechanism is powered by a third DC servomotor 106, FIG. 5, which will be termed the lift motor. Mounted on one side of the clamp and lift mechanism housing 34, the lift motor 106 is coupled to a straight-splined drive shaft 108 via a speed reducer 110 and timing belt or like drive linkage 112.

The drive shaft 108 is mounted within the clamp and lift mechanism housing 34 by having its midportion rotatably supported by bearing means 114, so as to be in right angular relation to the transfer bars 22. A pair of pinions 116 are splinedly mounted on the drive shaft 108 for joint rotation therewith and for sliding motion inn its axial direction toward and away from each other. The pinions 116 are rotatably mounted one in each clamp carriage 94 for joint movement therewith along the drive shaft 108 or along the guide rods 96.

Each clamp carriage 94 slidably receives a pair of upright guides 118 and 120 having their top ends coupled to a channeled support 122 holding one of the transfer bars 22 thereon. The pair of channeled supports 122 allow the transfer bars 22 to slide longitudinally thereover but constrain them to joint motion therewith and with the clamp carriages 94 toward and away from each other. Depending from each channeled support 122 in parallel spaced relation to each other, the pair of upright guides 118 and 120 are positioned on opposite sides of one of the pinions 16 on the drive shaft 108.

Figure 8:
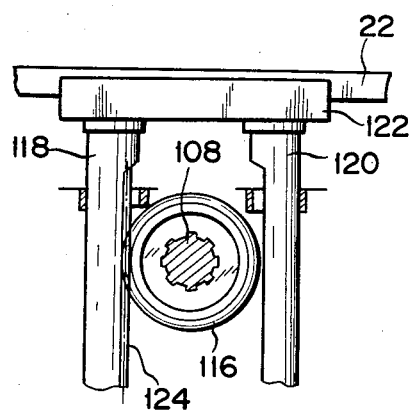
FIG. 8 is an enlarged section along the line VIII—VIII of FIG. 6.

As best seen in FIG. 8, one of each pair of upright guides, 118, has a series of rack teeth 124 formed longitudinally thereon for engagement with one pinion 116 on the drive shaft 108. Thus the bidirectional rotation of the pinions 116 results in the up-and-down motion of the transfer bars 22. The untoothed upright guides 120 function to guide such up-and-down motion of the transfer bars relative to the clamp carriages 94.

FIG. 5 shows at 126 an overrun detector cam associated with a noncontacting switch 128. A device such as a selsyn 130 provides a signal for the timely operation of the lift mechanism 38.

Overload Protection Mechanisms

The overload protection mechanisms did not appear in the drawings to which reference had in the foregoing, because they constitute an incidental feature of the present invention. The apparatus in accordance with the invention will operate satisfactorily without the overload protection mechanisms. They are, however, desired for the following reasons.

As has been set forth above, the apparatus includes the pair of clamp mechanisms 36 and 36' driven by the respective drive means including the clamp motors or DC servomotors 80 and 80'. The two DC servomotors are of course electrically synchronized to cause the clamp mechanisms 36 and 36' to simultaneously move the pair of transfer bars 22 toward and away from each other. Let it be supposed that some foreign matter is caught between either ends of the transfer bars during the movement thereof toward each other. Thereupon the electrical control system, not shown, of the apparatus will immediately stop the overloaded one of the clamp motors. The other clamp motor, however, allows the other end portions of the transfer bars to move toward each other some distance by inertia after the production of the emergency stop signal. Accordingly the transfer bars might be bent or broken without the overload protection mechanisms proposed hereby.

Thus the overload protection mechanisms are closely associated with the clamp mechanisms 36 and 36′. As far as the representative clamp mechanism 36 is concerned, two overload protection mechanisms are provided each between one pair of upright guides 118 and 120 and one channeled support 122 holding one transfer bar 22 thereon.

Figure 9:
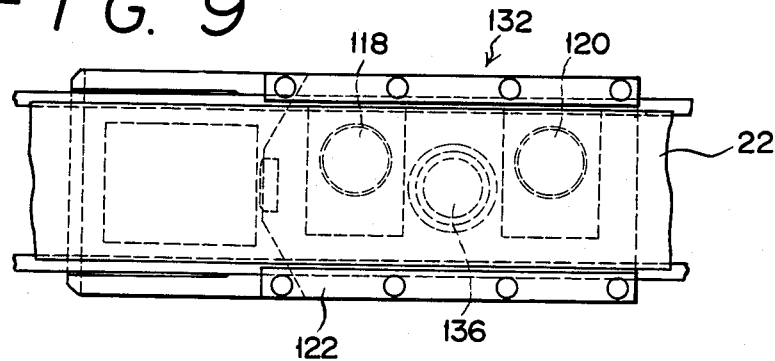
FIG. 9 is a top plan of one of the overload protection mechanisms for use in the apparatus of FIG. 1.
Figure 10:
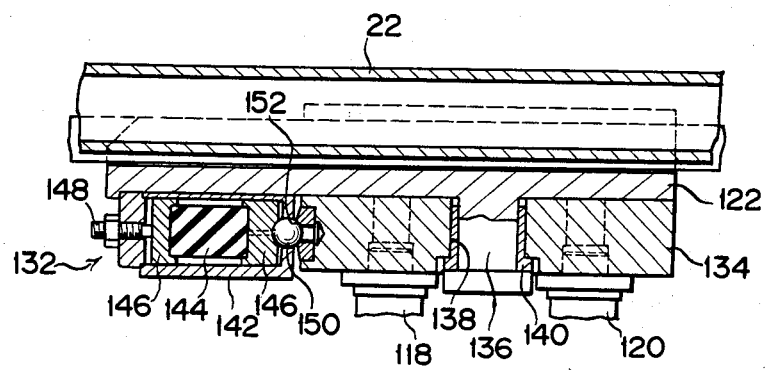
FIG. 10 is a vertical section through the overload protection mechanism of FIG. 9, the section being taken in the longitudinal direction of one of the transfer bars.
Figure 11:
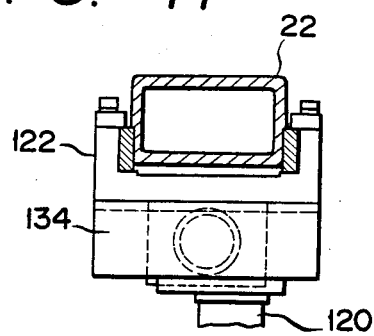
FIG. 11 is also a section through the overload protection mechanism, taken along the line XI—XI of FIG. 10.

FIGS. 9, 10 and 11 illustrate one such overload protection mechanisms generally labeled 132. It will be observed from FIG. 10 that the pair of upright guides 118 and 120 have their top ends rigidly coupled to a rest 134 underlying the channeled support 122, instead of being coupled directly to the channeled support as in FIGS. 6, 7 and 8. The support 122 has a headed pin or pivot 136 depending therefrom and rotatably engaged in a bore 138 created in the rest 134 via a sleeve bearing 140. The pivot 136 is positioned intermediate the pair of upright guides 118 and 120. The channeled support 122 is rotatable relative to the rest 134 about the pivot 136 but is normally restrained from such rotary motion by means set forth hereafter.

The channeled support 122 has further fixedly mounted on its underside an enclosure 142 for a body 144 of polyurethane rubber or like elastic material. The enclosure is displaced from the rest 134 in the longitudinal direction of the transfer bar 22 and is opposed thereto with a slight spacing therebetween.

Within the enclosure 142 the elastic body 144 is caught between a pair of pressure plates 146 slidable in the longitudinal direction of the transfer bar 22. A set screw or like threaded fastener element 148 on the enclosure 142 butts on the left hand pressure plate 146, as seen in FIG. 10, to hold the elastic body 144 under an adjustable degree of compression between the pair of pressure plates. Thus pressurized, the right hand pressure plate 146 acts on a ball 150 to normally hold the same partly engaged in a socket 152 defined in the opposed end of the rest 134. As long as the ball 150 remains engaged in the socket 152, the channeled support 122 is held locked against pivotal motion relative to the rest 134.

Operation

Figure 12:
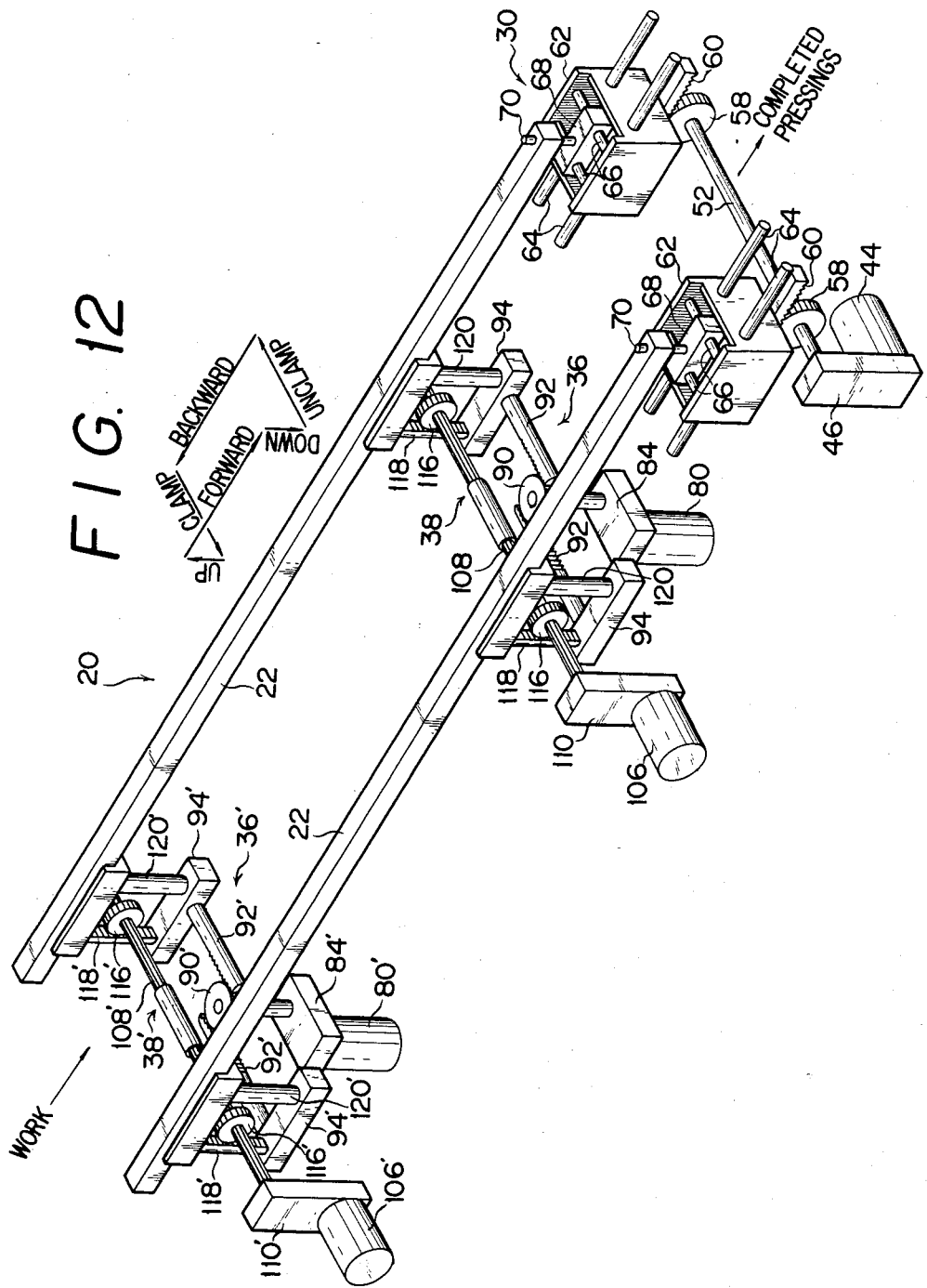
FIG. 12 is a diagrammatic perspective view of the work transfer apparatus, the view being explanatory of the operation of the apparatus and so not showing some

The operation of the three-dimensional work transfer apparatus constructed as in the foregoing will be best understood by referring to FIG. 12. It must be recognized, however, that this figure is highly diagrammatic, being explanatory of the operation of the apparatus, and does not exactly reflect the actual construction of the apparatus. For the parts not appearing in FIG. 12, reference may be had to FIG. 1 or other petinent drawings.

As has been stated, the apparatus successively transports or indexes generally flat workpieces, not shown, through a series of press stations whereby the workpieces are processed into desired pressings. The workpieces are loaded one after another on the apparatus at its left hand end, and the completed pressings leave the apparatus from its right hand end.

Upon loading of each workpiece on the left hand entrance end of the apparatus the unshown control system delivers control signals to the pair of clamp motors 80 and 80′ thereby causing their rotation in a predetermined forward direction. The clamp motors 80 and 80′ impart their rotation to the pinions 90 and 90′ of the clamp mechanisms 36 and 36′ via the speed reducers 84 and 84′, drive linkages 86 and 86′, and bevel gear assemblies 82 and 82′. Thereupon the pinions 90 and 90′ cause the respective pairs of racks 92 and 92′ to move in the opposite directions, such that the respective opposed pairs of clamp carriages 94 and 94′ travel toward each other together with the pair of transfer bars 22. The feed mechanism 30 does not interfere with such transverse motion of of the transfer bars 22 as then the pair of transverse carriages 68 slide along the respective pairs of guide rods 66.

The transfer bars 22 are equipped with opposed pairs of gripping fingers, not shown, at longitudinal spacings thereon. Upon movement of the transfer bars toward each other, one pair of gripping fingers grip the loaded workpiece.

Immediately following the clamping of the loaded workpiece between the transfer bars 22 by the clamp mechanisms 36 and 36′, the control system cause energization of the pair of lift motors 106 and 106′ to set them into rotation in a forward direction. The rotation of the lift motors 106 and 106′ is transmitted to the straight-splined drive shafts 108 and 108′ of the lift mechanisms 38 and 38′ via the speed reducers 110 and 110′, etc. The drive shafts 108 and 108′ rotate with the pairs of pinions 116 and 116′ splindly mounted thereon. Since these pinions mesh with the rack teeth on the upright guides 118 and 118′, the rotation of the pinions in the preassigned forward direction results in the upward motion of the transfer bars 22 via the overload protection mechanisms 132, FIGS. 9 through 11. During such upward travel of the transfer bars 22 the untoothed upright guides 120 and 120′ of the lift mechanisms 38 and 38′ bear the reactive forces of the upward displacement of the toothed guides 118 and 118′ in engagement with the pinions 116 and 116′ and so contribute to the smooth vertical motion of the transfer bars.

The feed mechanism 30 does not interfere with such vertical motion of the transfer bars 22, either, since then the transfer bars slide along the upstanding guide pins 70 on the transverse carriages 68. The gripped workpiece is thus lifted to a required height for transfer to the first press station.

Then the control system causes energization of the feed motor 44 in a forward direction. The feed motor imnparts its rotation to the drive shaft 52 via the speed reducer 46 and timing belt drive linkage 48. Fixedly mounted on the drive shaft 52, the pair of pinions 58 act on the racks 60 to cause the forward travel of the longitudinal carriages 62 along the pairs of guide rods 64. The transfer bars 22 travel forwardly with the carriages 62 since they are coupled to them via the upstanding guide pins 70. The transfer bars on their forward, as well as backward, stroke slide over the channeled supports 122 of FIGS. 6 through 8 or of FIGS. 9 through 11.

As the feed motor 44 is set out of rotation at the end of the forward stroke of the transfer bars 22, the lift motors 106 and 106′ are both set into rotation in a reverse direction. The result is the descent of the transfer bars 22.

Immediately thereafter the clamp motors 80 and 80′ are both set into rotation in a reverse direction. Thereupon the clamp mechanisms 36 and 36′ operate to move the transfer bars 22 away from each other. With this movement of the transfer bars the unshown gripping fingers thereon release and deposit the workpiece at the press station, where it may be processed in any desired manner.

The transfer bars must return to the initial position after the deposition of the first workpiece at the first press station. To this end the feed motor 44 is revolved in a reverse direction until the transfer bars reach the initial position.

Thereafter te apparatus repeats the foregoing cycle of operation, indicated by the arrows in FIG. 12, to index the successive workpieces from station to station. Such work indexing operation of the apparatus is of course concurrent with the work processing operation of the transfer press at the series of stations. The completed pressings are successively discharged from the transfer press by the delivery conveyor 42, FIGS. 2 and 4.

During the normal operation of the apparatus, as above, the overload protection mechanisms 132, FIGS. 9 through 11, remain inoperative, with the ball 150 engaged in the socket 152 in the rest 134 by the force of the compressed elastic body 144 in each overload protection mechanism. The transfer bars 22 are thus held locked agaisnt pivotal motion relative to the rests 134.

When the transfer bars 22 are overloaded during their clamping stroke, the overload protection mechanisms 132 operate as follows to prevent the bending or breaking of the transfer bars, or the damage of other pertinent parts, due to the overload. The transfer bars on being overloaded tend to turn about the depending pivots 136 of the channeled support 122. As the balls 150 become consequently dislodged from the sockets 152 against the forces of the compressed elastic bodies 144, the transfer bars become free to turn with the channeled supports 122 about their depending pivots 136 and so are protected from the overload.

Although the three-dimensional transfer apparatus of this invention has been shown and described hereinbefore only in conjunction with a transfer press, the apparatus can obviously find applications elsewhere. Further a variety of modifications and variations of the above disclosed embodiment will readily occur to one skilled in the art to conform to the specific requirements of the applications of the invention or to design preferences, without departing from the broader scope due to the invention.

What is claimed is:

1. An apparatus for transferring work in three dimensions through a succession of processing stations in a transfer press or the like, comprising:
    (a) a pair of transfer bars extending in parallel spaced relation to each other;
    (b) a feed mechanism adjacent one end of the transfer bar pair for longitudinally moving the same back and forth;
    (c) first drive means including a first DC servomotor for driving the feed mechanism;
    (d) a pair of clamp mechanisms adjacent the opposite ends of the transfer bar pair for conjointly moving the transfer bars toward and away from each other;
    (e) second drive means including a second DC servomotor for driving each of the clamp mechanisms;
    (f) a pair of lift mechanisms adjacent the opposite ends of the transfer bar pair for conjointly moving the same up and down; and
    (g) third drive means including a third DC servomotor for driving each of the lift mechanisms;
    the first, second, and third DC servomotors being controlled in time relation to each other to cause the operation of the feed, clamp, and lift mechanisms, respectively, in a predetermined sequence; and
    said feed mechanism having first guide means extending longitudinally of the transfer bar pair, a pair of longitudinal carriages coupled to the first drive means thereby to be reciprocated along the first guide means, second guide means on each longitudinal carriage extending at right angles with the transfer bar pair, a pair of transverse carriages mounted one on each longitudinal carriage for reciprocating movement along the second guide means, and means for coupling the transverse carriages to the respective transfer bars for joint longitudinal travel of the transfer bars with the longitudinal carriage means while allowing the transfer bars to move up and down relative to the transverse carriages.

2. The work transfer apparatus of claim 1 wherein each clamp mechanism comprises:
    (a) a pinion rotatably supported intermediate the pair of transfer bars and coupled to the second drive means thereby to be rotated bidirectionally;
    (b) guide means extending at right angles with the transfer bar pair;
    (c) a pair of clamp carriages operatively coupled to the respective transfer bars for joint movement therewith toward and away from each other along the guide means; and
    (d) a pair of racks extending from the respective clamp carriages toward each other and meshing with the pinion on opposite sides thereof, and
    wherein each lift mechanism comprises:
    (e) a straight-splined drive shaft rotatably supported in right angular relation to the pair of transfer bars and coupled to the third drive means thereby to be rotated bidirectionally;
    (f) a pair of pinions splinedly mounted on the drive shaft for joint rotation therewith and for relative sliding motion in the axial direction thereof, the pinions being rotatably mounted in the respective clamp carriages of one clamp mechanism for joint sliding motion therewith along the drive shaft;
    (g) at least one upright guide mounted to each clamp carriage for vertical sliding motion relative to the same and for joint travel therewith along the drive shaft, the upright guides mounted to the pair of clamp carriages of each clamp mechanism being operatively coupled to the respective transfer bars for joint movement therewith toward and away from each other and up and down; and
    (h) a series of rack teeth on each upright guide meshing with one pinion on the drive shaft to cause the up-and-down motion of one transfer bar in response to the bidirectional rotation of the drive shaft.

3. The work transfer apparatus of claim 2 wherein each lift mechanism has another untoothed upright guide mounted to each clamp carriage in parallel spaced relation to the toothed upright guide, the toothed and untoothed upright guides being disposed on opposite sides of one pinion on the drive shaft and being jointly movable up and down.

4. The work transfer apparatus of claim 2 wherein the pair of clamp carriages of each clamp mechanism are coupled to the respective transfer bars via overload protection means for allowing the transfer bars to pivot in their own plane relative to the clamp carriages when the transfer bars are overloaded during thier movement toward each other.

5. The work transfer apparatus of claim 3 further comprising an overload protection mechanism interposed between each upright guide of each lift mechanism and the corresponding one of the transfer bars, each overload protection mechanism comprising:
(a) a rest rigidly mounted on the top end of one upright guide;
(b) a channeled support rotatably mounted on the rest and holding one transfer bar thereon so as to allow longitudinal sliding motion of the transfer bar while restraining the same from lateral displacement;
(c) a pivot depending from the channeled support and rotatably engaged in a bore defined in the rest;
(d) resilient means mounted to the underside of the channeled support in a position displaced from the rest in the longitudinal direction of the transfer bar;
(e) there being a socket defined in the rest in opposed relation to the resilient means; and
(f) a ball normally held partly engaged in the socket in the rest by the force of the resilient means, the ball being dislodged from the socket against the force of the resilient means when the transfer bar is overloaded during the movement thereof toward the other transfer bar, thereby allowing the transfer bar to turn with the channeled support about the depending pivot thereof.

6. The work transfer apparatus of claim 5 wherein the resilient means of each overload protection mechanism comprises:
(a) an enclosure rigidly mounted to the underside of the channeled support;
(b) a body of elastic material within the enclosure;
(c) a pair of pressure plates slidably mounted within the enclosure and arranged on opposite sides of the elastic body, one of the pressure plates acting on the ball to normally hold the same partly engaged in the socket in the rest; and
(d) a threaded fastener element acting on the other pressure plate to hold the elastic body under an adjusted degree of compression between the pair of pressure plates.

7. Apparatus for three-dimensionally transferring work, comprising:
(a) a pair of transfer bars extending in parallel spaced relation to each other;
(b) a feed mechanism adjacent one end of the transfer bar pair for longitudinally moving the same back and forth, the feed mechanism comprising:
(1) first guide means extending longitudinally of the transfer bar pair;
(2) longitudinal carriage means reciprocably movable along the first guide means;
(3) second guide means on the longitudinal carriage means extending at right angles with the transfer bar pair;
(4) a pair of transverse carriages movable toward and away from each other along the second guide means; and
(5) means for coupling the transverse carriages with the respective transfer bars in such a way that the transfer bars are movable longitudinally with the longitudinal carriage means, toward and away from each other with the transverse carriages, and up and down relative to the transverse carriages;
(c) first drive means coupled to the longitudinal carriage mens of the feed mechanism and including a first DC servomotor for controllably reciprocating the longitudinal carriage means along the first guide means;
(d) a pair of clamp mechanisms adjacent the opposite ends of the transfer bar pair for conjointly moving the transfer bars toward and away from each other, each clamp mechanism comprising:
(1) third guide means extending at right angles with the transfer bars;
(2) a pair of clamp carriages independently movable along the third guide means;
(3) rack-and-pinion means for simultaneously moving the clamp carriages toward and away from each other along the third guide means;
(e) second drive means coupled to the rack-and-pinion means of each clamp mechanism and including a second DC servomotor for controllably moving the pair of clamp carriages of each clamp mechanism toward and away from each other along the third guide means;
(f) a pair of lift mechanisms adjacent the opposite ends of the transfer bar pair for conjointly moving the same up and down, each lift mechanism comprising:
(1) a straight-splined drive shaft rotatably supported in right angular relation to the transfer bars;
(2) a pair of pinions splinedly mounted on the drive shaft for joint rotation therewith and for relative sliding motion in the axial direction thereof, the pinions being rotatably mounted in the respective clamp carriages of one clamp mechanism for joint sliding motion therewith along the drive shaft;
(3) a rack mounted to each clamp carriage for vertical sliding motion relative to the same and for joint travel therewith along the drive shaft, each rack being engaged with one pinion on the drive shaft thereby to be moved up and down; and
(4) means for connecting each rack to one transfer bar so as to allow longitudinal displacement of the transfer bar relative to the rack while restraining the transfer bar from lateral displacement relative to the rack;
(g) third drive means coupled to the straight-splined drive shaft of each lift mechanism and including a third DC servomotor for controllably moving the pair of transfer bars up and down.

8. The three-dimensional work transfer apparatus of claim 7 wherein the means for connecting each rack of each lift mechanism to one transfer bar include an overload protection mechanism comprising:
(a) a rest rigidly mounted on the top end of each rack of each lift mechanism;
(b) a channeled support rotatably mounted on the rest and holding one transfer bar thereon so as to allow longitudinal sliding motion of the transfer bar while restraining the same from lateral displacement;
(c) a pivot depending from the channeled support and rotatably engaged in a bore defined in the rest;
(d) resilient means mounted to the underside of the channeled support in a position displaced from the rest in the longitudinal direction of the transfer bar;
(e) there being a socket defined in the rest in opposed relation to the resilient means; and
(f) a ball normally held partly engaged in the socket in the rest by the force of the resilient means, the ball being dislodged from the socket against the force of the resilient means when the transfer bar is overloaded during the movement thereof toward the other transfer bar, thereby allowing the transfer bar to turn with the channeled support about the depending pivot thereof.

* * * * *